United States Patent
Siclari

[11] 3,943,602
[45] Mar. 16, 1976

[54] PATTY MAKER
[76] Inventor: Anthony Siclari, 1261 E. 57th St., Brooklyn, N.Y. 11234
[22] Filed: Oct. 17, 1973
[21] Appl. No.: 407,310

[52] U.S. Cl. ............................................. 17/32
[51] Int. Cl.² ...................................... A22C 7/00
[58] Field of Search ........ 17/32; 222/436, 361, 362; 425/182, 185, 190, 192, 193, 195, 246, 247, 251, 253, 254, 255

[56] References Cited
UNITED STATES PATENTS

| | | | |
|---|---|---|---|
| 1,987,030 | 1/1935 | Shelgren | 17/32 |
| 2,187,511 | 1/1940 | Baxter | 17/32 |
| 2,941,274 | 6/1960 | Wise et al. | 425/254 |
| 3,594,854 | 1/1969 | Roedel | 17/32 |

*Primary Examiner*—Robert Peshock
*Attorney, Agent, or Firm*—Stephen Wyden

[57] ABSTRACT

A device accepts chopped meat or other patty-consistency food in a plunger operated compartment from which the food is extruded through an opening to a pattie mold. Molds are stacked in the space beneath, the lower most mold bearing against a compressed coiled spring. A slotted opening permits withdrawal of the uppermost mold adjacent to the extrusion chamber.

4 Claims, 9 Drawing Figures

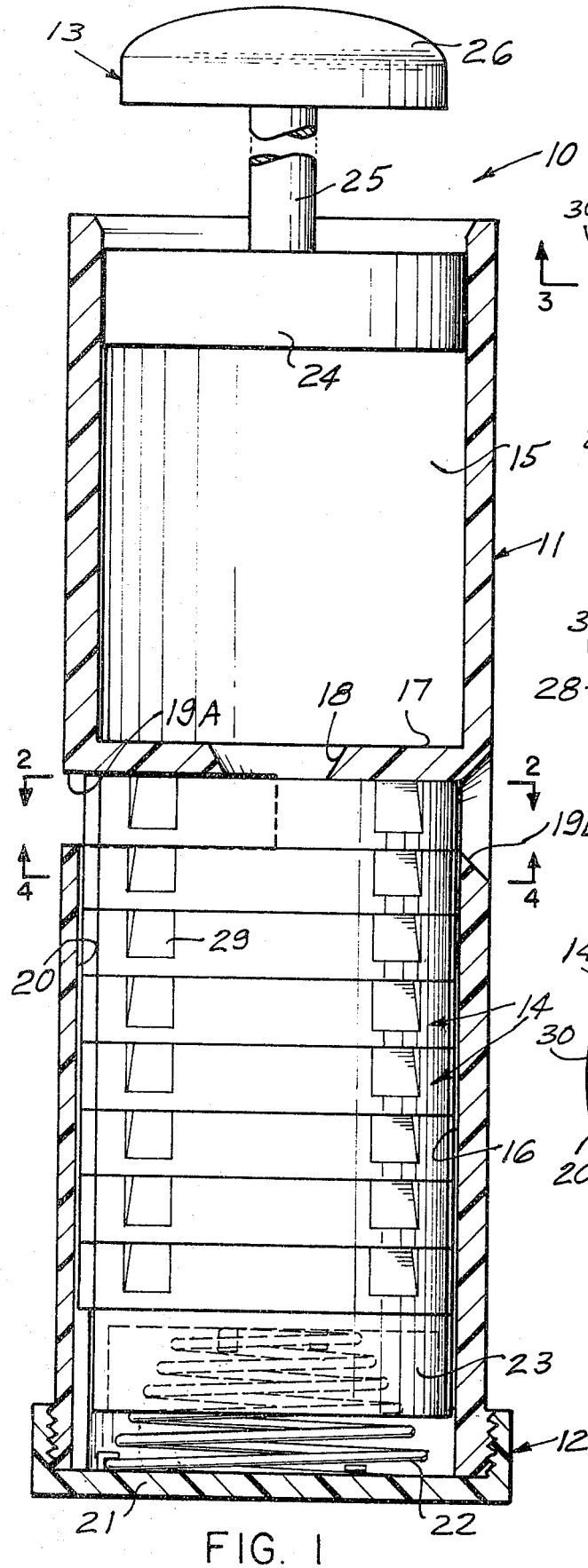
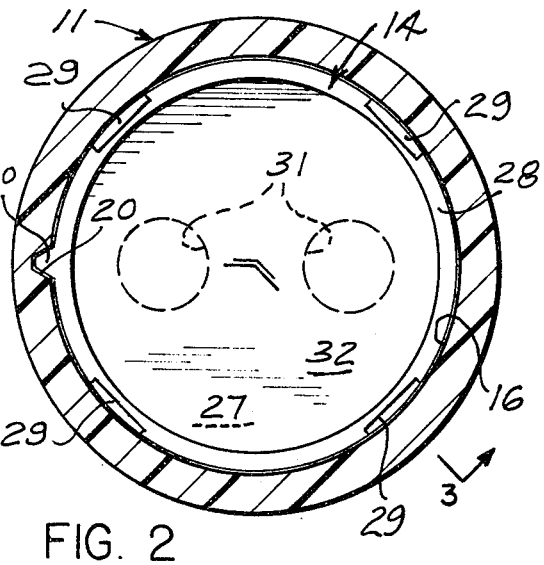
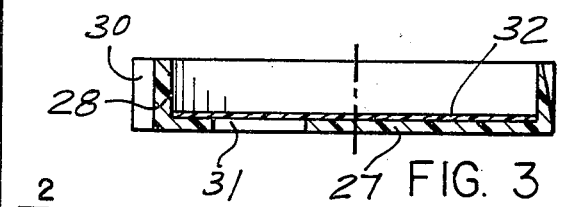
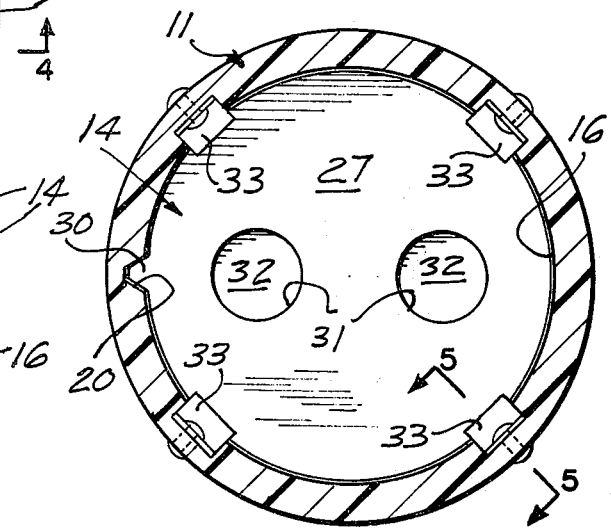
FIG. 1
FIG. 2
FIG. 3
FIG. 4

PATTY MAKER

This invention relates to food preparation accessories, particularly to accessories for molding meat patties or the like.

A principal object of this invention is to provide a device for producing meat patties by extruding the meat under pressure through an opening in a meat storage chamber into a patty mold. The device further provides for stacking a number of molds that automatically move adjacent to the extrusion chamber, one by one, as each meat filled mold is withdrawn through an opening provided on the side of the mold storage chamber. A hand-thrust piston from above is pushed down to fill the mold and a coiled spring beneath the stacked molds moves each successive mold up into position for filling. A spring detent means locks the patty mold in position against downward movement from piston pressure above. A plastic disc seated in the bottom of each mold is accessable through openings for pushing the patty up and out.

Another object of the present invention is to provide a patty maker that is easy to load, easy to operate, is attractive in appearance and can be ruggedly constructed for long, dependable use at a low cost.

A further object is to provide a patty maker that is easy to disassemble for washing the several parts and maintaining the device perfectly clean.

A still further object if to provide a patty maker which will accept patty molds for making a thinner patty.

A yet further object is to provide a patty maker that lends itself readily in an attractive manner to a quickly-detachable base support so that the device cannot move about or tilt while in use.

These and other objects will become evident upon a study of the following specification and the accompanying drawings, wherein:

FIG. 1 is an elevation section view;

FIG. 2 is a plan section view taken on a line 2—2 in FIG. 1;

FIG. 3 is an elevation section view taken on a line 3—3 in FIG. 2;

FIG. 4 is a plan section view taken on a line 4—4 in FIG. 1;

Figure 5:
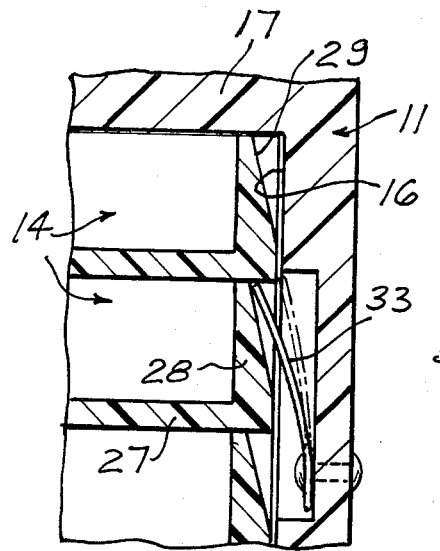
FIG. 5 is a fragmentary elevation section view at the supporting clip.

Referring to the figures, the patty 10 comprises a plastic cylinder 11, a detachable base assembly 12, an extruding unit 13 and a multiplicity of patty molds 14.

Cylinder 11 shows a cavity 15 for holding the meat mix and a cavity 16 for holding molds 14, separated by a dividing wall 17 having a tapered opening 18. Cavity 16 is provided beneath partition 17 with an opening 19a extending to the diameter of cylinder 11 and, diametrically opposite, a tapered opening 19b. Finally, cylinder 11 is provided with a keyway 20.

Base closure 12, attachable to cylinder 11 at a thread shown or a bayonet lock or the like comprises a cover 21, a coiled compression spring 22 and a spring bearing plate 23.

Extrusion unit 13 comprises an extrusion piston 24 either integral or attached to a shaft 25 extending upwards to a palm pad 26.

Patty mold 14 shows a bottom wall 27, a cylindrical side wall 28, a multiplicity of tapering recesses 29, a key 30 and a pair of finger-openings 31. A plastic disc 32 slidably fits into the bottom of mold 14.

Referring in particular to FIGS. 4 and 5, detent springs 33 are provided equal in number and disposed angularly in agreement with recesses 29.

Figure 6:
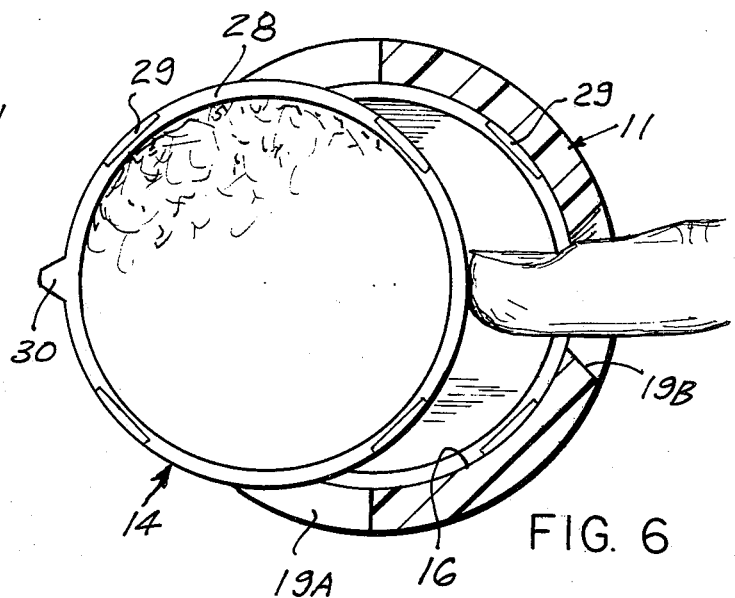
FIG. 6 is a plan section view showing removal of the patty mold.

The patty maker is used as follows: closure 12 is removed. Holding cylinder 11 in reverse position to that shown in FIG. 1, cavity 16 is loaded with patty molds 14. Spring cap 23 is then placed into the cavity against the exposed patty molds and cover 21 is pushed down, compressing spring 22, and finally screwing cover 21 onto the threaded portion of cylinder 11. The patty maker is turned upright in the orientation of FIG. 1, extrusion unit 13 is removed and cavity 15 filled with the meat mix. It now becomes clear that pressure of the palm on cushion 26 will cause meat mixe to be extruded through opening 18 and fill the top most molds 14. Referring in particular to FIGS. 4 and 5, it will be seen how detent springs 33 prevent the patty mold from moving downward while applying pressure to the meat mix. Depending upon the consistency of the meat mix, and quickly becoming accustomed to the feel of operating the device, resistance to pressure will indicate then the mold is full. At this point, as clearly seen in FIG. 6, the finger is placed in opening 19b and the filled patty mold 14 is pushed out through 19a. The finger need go in only a short distance, at which point the patty mold can be grasped between thumb and fore finger at its diameter in opening 19a and the mold withdrawn.

Figures 7, 8:
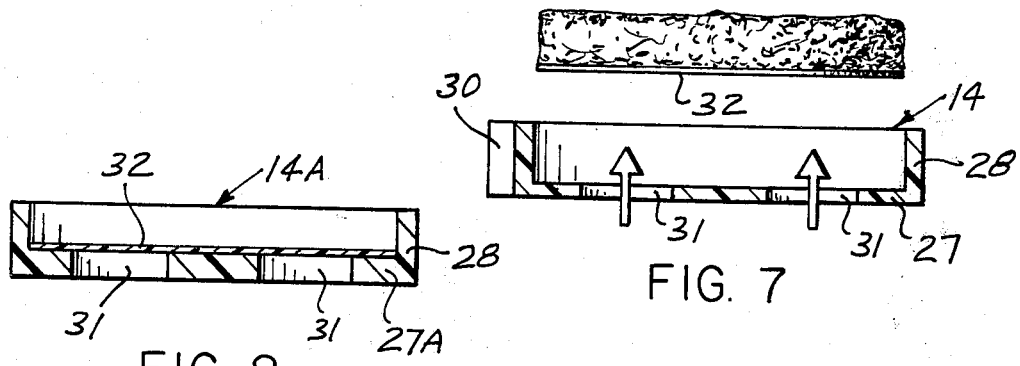
FIG. 7 is an elevation section view showing removal of the patty from the mold.
FIG. 8 is a plan section view of a modified mold for making smaller patties.

Now referring in particular to FIG. 7, one or two fingers are placed in either one or both openings 31 and the patty comes out of the mold lying on disc 32.

Referring in particular to FIG. 8, the exterior dimensions of this patty mold 14a shows a thicker bottom 27a, thereby indicating a potential for changing the size of the patty merely by changing the mold.

Figure 9:
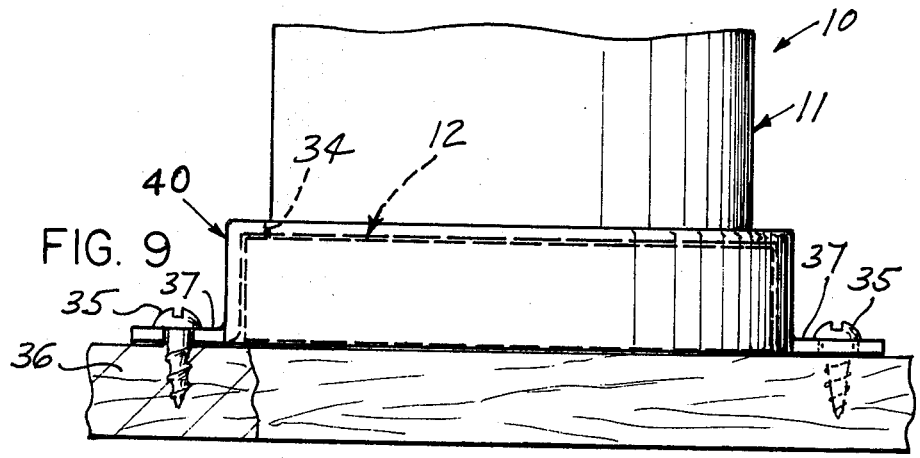
FIG. 9 is an elevation view of a bayonet-locking support for the patty maker.

Referring to FIG. 9 a bayonet base 40 has an opening 34 receiving slidably cylinder 11. Screws 35 are turned into the work table 36 to the point where the bayonet flanges 37 slidably fit under the screw heads. By this means a permanent work place is available to the patty maker. The patty maker is filled with molds, even while base 40 is in place on cylinder 11, closure 12 is screwed on and base 40 engaged by a small turn under screw heads 35. The patty maker is now secure against chipping or other movement on the work table regardless of the stages of work, of meat mix loading, of extruding and of withdrawing the filled patty mold.

What I claim is:

1. A patty maker for making hamburger or other food mix patties having a food mix extrusion and a mold-filling means, comprising:
   a cylinder, divided into an upper chamber for holding food mix,
   a lower chamber for holding stacked patty molds by a dividing partition between said chambers,
   the partition having an opening therethrough for communication of food mix to the adjacent of said patty molds, said lower chamber, holding said stacked molds, said lower chamber closed at the bottom by a cover having attached thereto a coiled compression spring, said lower chamber at the top having a tapered opening for passage therethrough of a finger tip for the purpose of ejecting said patty molds lateral to the cylinder axis, said lower part of the cylinder having a keyway, each of said patty molds having a key for non-rotational axial-sliding fit of said patty molds in said keyway, said spring attached to said lower cover biasing said patty molds upward towards the opening in said partition, said patty molds each provided with circumferentially disposed exterior slots tapering inward from the exterior surface and upward to the top of the mold, said lower part of the cylinder on the interior wall fitted correspondingly in radial alignment with said tapered slots with inward biased flat springs for the purpose of locking the topmost of said molds against downward movement when applying extrusion pressure to the food mix, said coil spring overcoming said flat springs by forcing the stacked molds upwardly so that the stacked molds are automatically moved up and locked into place each time the uppermost mold is removed, said keyway serving the purpose of aligning said patty mold so that said flat springs will always meet said tapered recesses as each mold comes up, means of applying extrusion pressure comprising a piston slidably, but removably, fitted into the upper of said chamber and connected by a shaft to a member suited for the application of pressure by the palm of the hand.

2. A patty maker according to claim 1 having a patty mold in which a disc is fitted freely in the bottom accessable through one or more openings in said patty mold for the application thereof of finger pressure for the purpose of removing the patty intact.

3. A patty maker according to claim 1 having a patty mold of fixed external dimension which may vary in dimension internally in order to make a smaller or larger patty with the same device.

4. A patty maker according to claim 1 having a securing means at the base for attachment to a work table, such securing means having a quick release feature such as bayonet slots or the like for the purpose of steadying the patty maker during use.

* * * * *